United States Patent [19]

Yamazaki et al.

[11] Patent Number: 5,265,136
[45] Date of Patent: Nov. 23, 1993

[54] SODIUM COOLED FAST REACTOR

[75] Inventors: Hiroshi Yamazaki, Sagamihara;
Hiroto Kawakami, Kawasaki, both of Japan

[73] Assignee: Kabushiki Kaisha Toshiba, Kawasaki, Japan

[21] Appl. No.: 955,056

[22] Filed: Oct. 1, 1992

[30] Foreign Application Priority Data

Oct. 1, 1991 [JP] Japan ................... 3-253806

[51] Int. Cl.$^5$ ............................................ G21C 15/00
[52] U.S. Cl. ................................ 376/405; 376/361; 376/290; 376/298
[58] Field of Search ............... 376/405, 404, 361, 290, 376/298

[56] References Cited

U.S. PATENT DOCUMENTS

| | | | |
|---|---|---|---|
| 4,526,742 | 7/1985 | Hannerz | 376/282 |
| 4,698,201 | 10/1987 | Masse | 376/298 |
| 4,767,594 | 8/1988 | Hunsbedt | 376/299 |
| 4,927,597 | 5/1990 | Cros | 376/290 |
| 5,013,521 | 5/1991 | Azarian | 376/290 |
| 5,021,211 | 6/1991 | Hunsbedt et al. | 376/290 |

FOREIGN PATENT DOCUMENTS 60-207087 10/1985 Japan .

Primary Examiner—Donald P. Walsh
Assistant Examiner—Frederick H. Voss
Attorney, Agent, or Firm—Oblon, Spivak, McClelland, Maier & Neustadt

[57] ABSTRACT

A sodium cooled fast ractor comprises a reactor vessel in which a liquid metal coolant is accommodated, a core disposed substantially a lower central portion of the reactor vessel in an installed state, a core support structure secured to the reactor vessel for supporting the core, the core support structure dividing an interior of the reactor vessel into a high-pressure plenum below the core and a low-pressure plenum above the high-pressure plenum, a circulation pump unit for applying a discharge pressure to the liquid metal coolant and circulating the same, and an intermediate heat exchanger for performing a heat exchanging operation of the coolant in the reactor vessel. The circulation pump unit is composed of an electromagnetic circulation pump provided with a discharge port and a closed gas space, which is filled up with a closed gas, defined above and communicated with the discharge port. The discharge port is also communicated with the high-pressure plenum, wherein the liquid metal coolant above the discharge port flows into the high-pressure plenum by the discharge gas pressure of the gas accummulated in the closed gas space by the actuation of the electromagnetic circulation pump at a time of trip thereof.

11 Claims, 7 Drawing Sheets

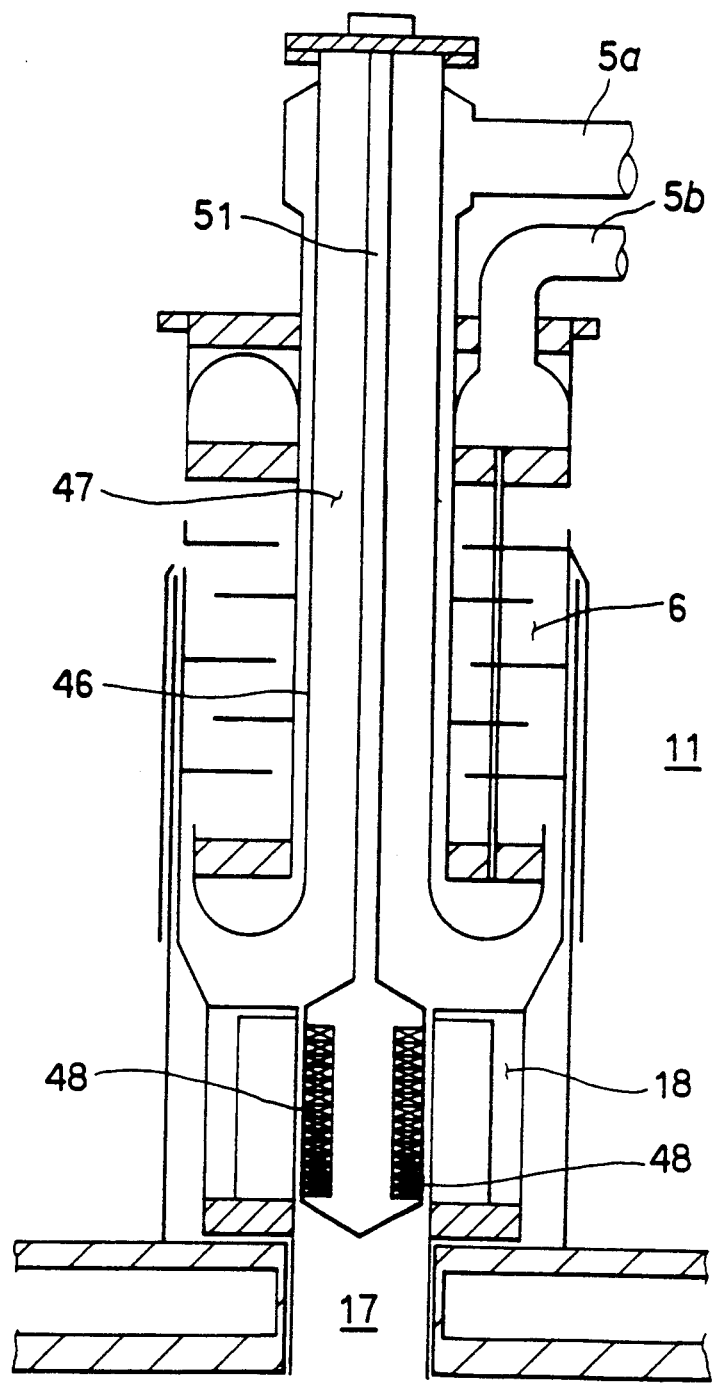
F I G. 5B

SODIUM COOLED FAST REACTOR

BACKGROUND OF THE INVENTION

The present invention relates to a sodium cooled fast reactor for ensuring a reactor core coolant flow rate in a core emergency and improving a safeness of the core operation by a static system utilizing only a physical phenomenon in a reactor vessel.

Generally, in a fast reactor, an upper opening is closed by a roof slab and a core, in which a plurality of fuel assemblies are arranged, is disposed at substantially the central portion of the reactor vessel and supported by a core supporting structure disposed at the lower portion of the reactor vessel. A core upper structure is disposed at the upper portion of the core so as to penetrate the roof slab and a plurality of circulation pumps and intermediate heat exchangers are suspended from the roof slab at the outer peripheral portions of the core upper structure. A liquid metal sodium is utilized as a coolant for the fast reactor. The core is cooled by a sodium having a low temperature fed by means of the circulation pumps and the sodium heated after the cooling of the core is then cooled through the heat exchanging operation with a secondary sodium as a secondary coolant in the intermediate heat exchangers, the thus cooled sodium being thereafter again fed into the core by means of the corculation pumps.

One example of a conventional tank type fast reactor will be described hereunder with reference to FIG. 6.

Referring to FIG. 6, reference numeral 1 denotes a reactor vessel in which a liquid sodium 2 as a liquid metal coolant is accommodated. An upper opening of the reactor vessel 1 is closed by a roof slab 3. At the upper portion of the inside of the reactor vessel 1 there is formed a cover gas space 15 above the free surface level of the liquid sodium 2. A plurality of circulation pumps 4, only one being illustrated, are disposed so as to penetrate the roof slab 3 and a plurality of intermediate heat exchangers 6 only one being illustrated provided at its upper portions with secondary sodium inlet and outlet, are also disposed so as to penetrate the rool slab 3. The lower portions of the circulation pump 4 and the intermediate heat exchanger 6 penetrating downward through the roof slab 3. The intermediate heat exchanger 6 is provided with sodium inlet and outlet ports 5a and 5b positioned above the roof slab 3. A core 8 accommodating a plurality of fuel assemblies is mounted on a core support structure 9 at substantially the central portion of the reactor vessel 1.

In the tank type fast reactor of the structure described above, the coolant is forcibly circulated by means of the circulation pump and a low-temperature sodium 2a guided into a high-pressure plenum 17 is fed into the core 8 through an incore duct 16 to cool the core 8. A high-temperature sodium 2b after the cooling of the core 8 flows into a low-pressure plenum 11, upwardly radially along the lower portion of the core upper structure 10 as shown by arrows, and a portion of the high-temperature sodium 2b is guided into the intermediate heat exchanger 6 through windows 12 formed to the heat exchanger 6. The sodium 2b introduced into the heat exchanger 6 passes a plurality of electric heattubes, not shown, incorporated in the heat exchanger 6 to thereby carry out the heat exchanging operation with the secondary sodium, thus being cooled, and the sodium cooled after the heat exchanging operation then flows out into the high-pressure plenum 17 through an outlet nozzle 13 of the intermediate heat exchanger 6. The low-temperature sodium 2a flows out through the outlet nozzle 13 is guided to the circulation pump 4 and then introduced into the incore duct 16 and then to the core 8. The flows of the low- and high-temperature sodiums 2a and 2b are separated by two partition walls 7 composed of upper and lower partition wall sections.

In the conventional art, at an emergency core shutdown period of the sodium cooled fast reactor of the structure described above, control rods, not shown, are rapidly inserted into the core 8 to apply a negative reactivity to thereby stop a nuclear reaction, thus lowering the temperatures of the fuel and the liquid sodium 2. Simultaneously, the operation of the circulation pump 4 is stopped for alleviating cold shock to machinery disposed in the reactor vessel to thereby remove decay heat through a small flow rate operation by means of a pony motor.

In a case where the flow of the liquid sodium 2 is instantaneously stopped through the operation stop of the circulation pump 4, the flow rate of the liquid sodium for cooling the core 8 becomes short and the liquid sodium as the coolant may be boiled and, in an adverse case, the fuel may be damaged. In order to obviate such defect and to gently lower (coast down) the flow rate of the liquid sodium, in the conventional technology, when the circulation pump operation stops, a flow rate control device, not shown, for gently stopping the operation of the circulation pump 4 by a mechanical inertia due to a large-sized flywheel is installed at an external portion of the reactor.

However, a severe reliability is required for the flow rate control device in the view point of the safeness, and the flow rate control device is itself has a large structure for this purpose. Particularly, in a case where an electromagnetic pump is utilized for the circulation pump 4, the pump has no rotational inertia force, so that it becomes more important to install such flow rate control device with high operational reliability. Furthermore, in a case where the pump is stopped by, for example, an adhetion of a shaft of the pump or dielectric brakedown of the electromagnetic pump, there causes a case that the flow rate control device is not operated at all, thus providing a significant problem.

SUMMARY OF THE INVENTION

An object of the present invention is hence to substantially eliminate defects or drawbacks encountered in the prior art and system to provide a sodium cooled fast reactor capable of, without utilizing an external device for carrying out the coast down of the sodium flow rate, ensuring the coast-down flow rate for the associated operation of the pony motor only by means of the static physical phenomenon in the reactor vessel and of improving the safety operation of the reactor.

This and other object can be achieved according to the present invention by providing a sodium cooled fast ractor comprising:

a reactor vessel in which a liquid metal coolant is accommodated;

a core disposed substantially a lower central portion of the reactor vessel in an installed state;

a core support structure secured to the reactor vessel for supporting the core, the core support structure dividing an interior of the reactor vessel into a high-pressure plenum below the core and a low-pressure plenum above the high-pressure plenum;

a circulation pump means for applying a discharge pressure to the liquid metal coolant and circulating the same; and an intermediate heat exchanging means for performing a heat exchanging operation of the coolant in the reactor vessel, the circulation pump means being composed of an electromagnetic circulation pump means provided with a discharge port and a closed gas space, which is filled up with a closed gas, defined above and communicated with the discharge port, the discharge port being also communicated with the high-pressure plenum, wherein the liquid metal coolant above the discharge port flows into the high-pressure plenum by the discharge gas pressure of the gas accummulated in the closed gas space by the actuation of the electromagnetic circulation pump means at a time of trip thereof.

In preferred embodiments, the discharge port is composed of a domed structure having a central through hole and the closed gas is argon gas.

There is further comprised of a dam wall structure concentrically disposed inside of an inner wall of the reactor vessel for defining a tourus plenum between the dam wall structure and the inner wall of the reactor vessel, the tourus plenum being communicated with the high-pressure plenum. The tourus wall structure is provided with a bottom end secured to the core support structure and a top end disposed above a free surface level of the liquid metal coolant filling in the low-pressure plenum, the tourus plenum being communicated with the high-pressure plenum through a hole formed to the core support structure, wherein the liquid metal coolant flows from the tourus plenum into the high-pressure plenum in accordance with a liquid surface level difference between the liquid metal coolant in the tourus plenum and that in the low-pressure plenum at a time of the trip of the electromagnetic circulation pump means.

The electromagnetic circulation pump means and the intermediate heat exchanging means are constructed integrally as a cooling unit and the electromagnetic circulation pump means includes an inner casing in a manner suspended at its upper portion in which a closed tube is disposed, the closed tube being filled up with the liquid metal coolant with an upper space filled up with a closed gas, in an installed state, and communicated with the high-pressure plenum at the discharge port. The cooling unit is suspended from an upper structure closing an upper opening of the reactor vessel. The electromagnetic circulation pump means is disposed below the intermediate heat exchanging means in an installed state.

According to the structures of the present invention described above, a required or desired coast down flow rate of the liquid metal coolant can be obtained only by utilizing a static energy such as a closed gas accumulated gas energy without utilizing any external mechanical means or equipment. The coast down flow rate acts only due to the physical phenomenon of the discharge pressure difference between the pump operation period and the trip time thereof, thus surely operating.

Furthermore, the above mentioned coast down flow rate may be ensured only by utilizing a static energy such as potential energy caused by the liquid level difference in the high- and low-pressure plenum.

The nature and further features of the present invention will become more clear from the following descriptions made with reference to the accompanying drawings.

BRIEF DESCRIPTION OF THE DRAWINGS

In the accompanying drawings:

FIG. 5B shows a modified embodiment of the embodiment shown in FIG. 5A; and

DESCRIPTION OF THE PREFERRED EMBODIMENTS

Figure 1:
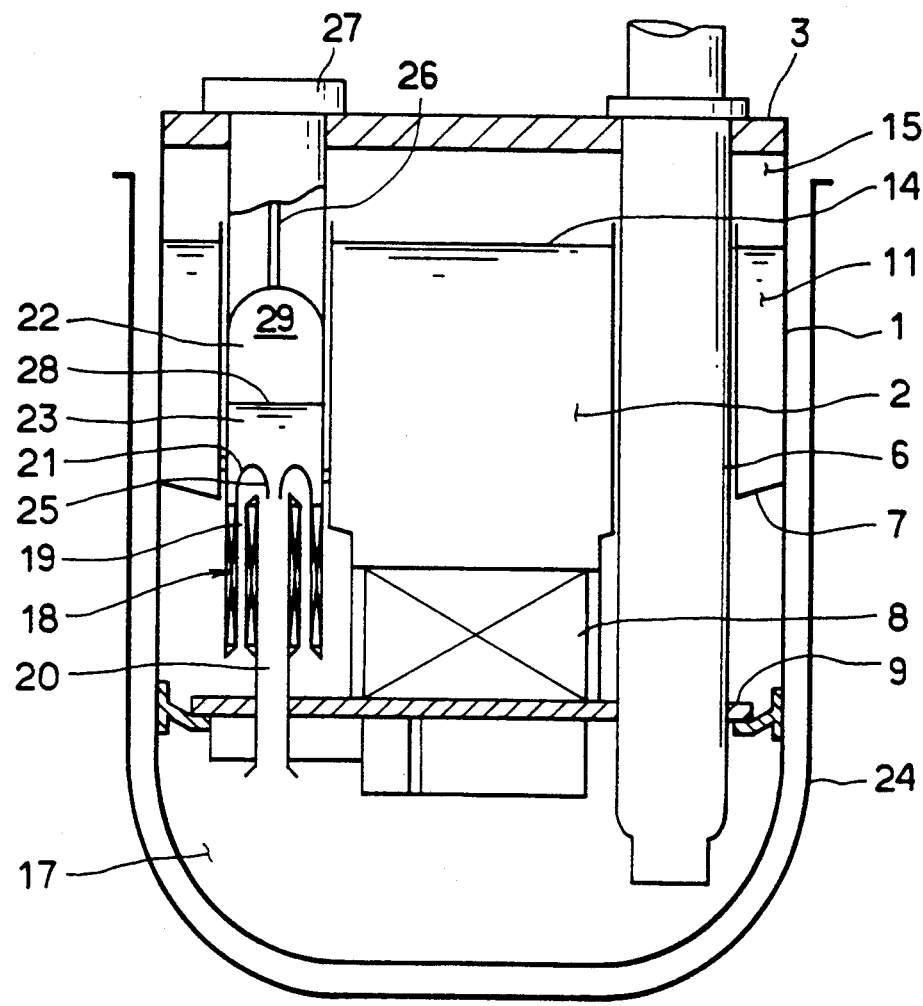
FIG. 1 shows an elevational section of a first embodiment according to the present invention.
Figure 2:
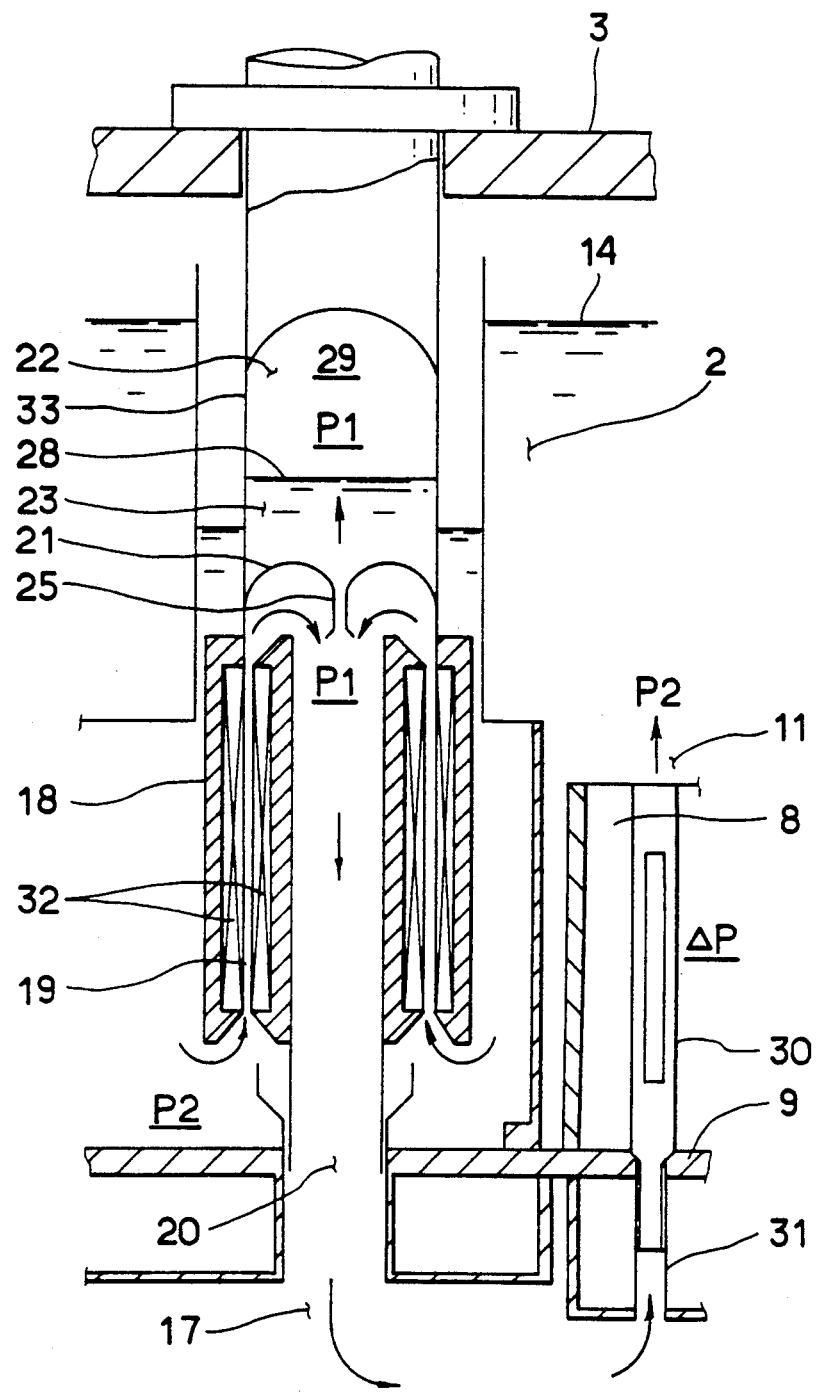
FIG. 2 is an elevation in an enlarged scale showing an electromagnetic pump means incorporated in the first embodiment of FIG. 1.
Figure 6:
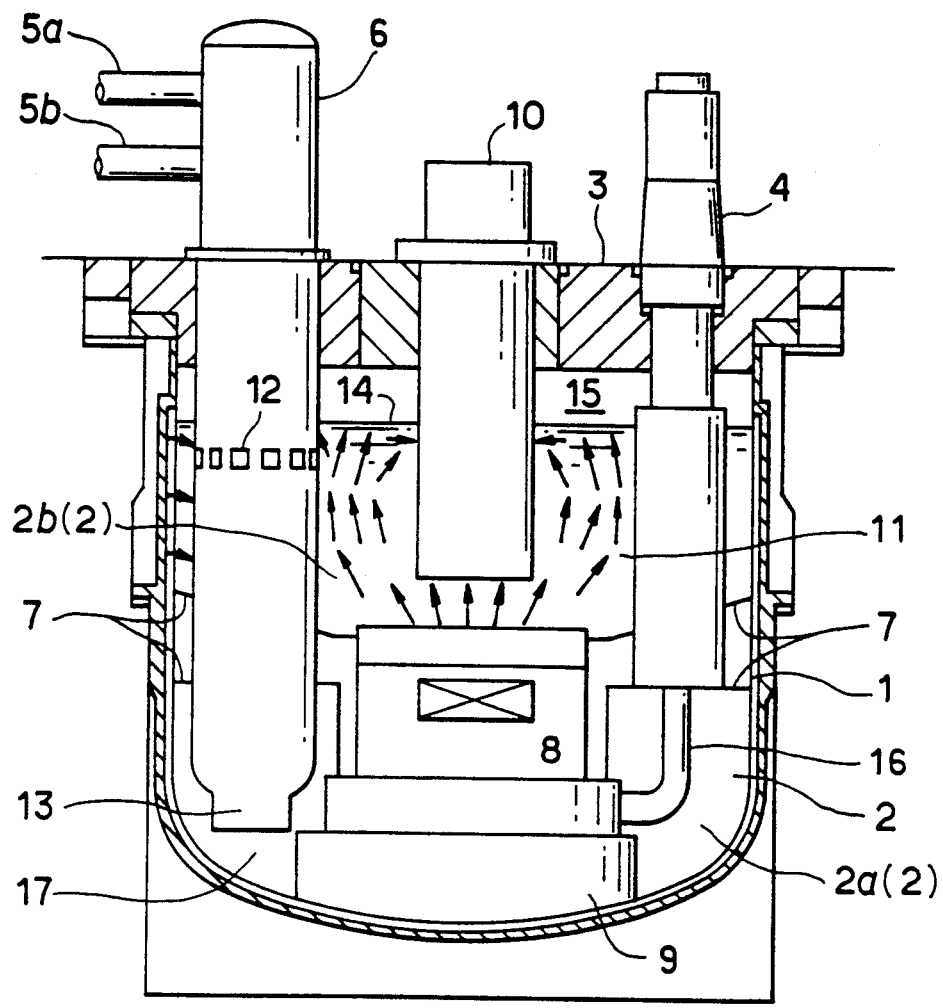
FIG. 6 is an elevational section of a conventional sodium cooled type fast reactor.

FIGS. 1 and 2 represent a first embodiment of a sodium cooled fast reactor according to the present invention, in which like reference numerals are added to portions or members corresponding to those shown in FIG. 6.

Referring to FIG. 1, a reactor vessel 1 has an upper opening covered by a roof slab 3, and a liquid sodium 2 as a liquid metal coolant is accommodated in the reactor vessel 1. In the reactor vessel 1, the upper space of the liquid sodium 2 is formed as a cover gas space 15 in which an inert gas not reacted with the liquid sodium 2 fills so as to cover a free surface level 14 of the liquid sodium 2. A core 8 is mounted on a core support structure 9 at substantially the lower central portion in the reactor vessel 1, which is covered by a guard vessel 24.

Furthermore, in the reactor vessel 1, a plurality of intermeditate heat exchangers 6 are disposed at a circumferential portion of the core 8, and a plurality of center return type electromagnetic circulation pumps 18, only one being illustrated, are disposed in the reactor vessel 1 so as to vertically penetrate the core support structure, 9. The core support structure 9 acts in a certain since as a partition structure for sectioning the inner space of the reactor vessel 1 into an upper low-pressure plenum 11 and a lower high-pressure plenum 17. The electromagnetic circulation pump 18 is provided with an upper discharge port to which a top dome 21 having a central penetration hole 25 is mounted, and the liquid sodium 2 disposed above the dome 21 is set so as to have a constant free liquid level 28 by a gas pressure control device 27 through an argon gas line 26. When the liquid level 28 of the liquid sodium 2 is once set to the predetermined constant level, the argon gas line 26 is closed, whereby an argon gas space above the electromagnetic circulation pump 18 is defined as a closed gas space 22.

The operation and function of the liquid sodium fast reactor of this embodiment will be described hereunder with reference to FIG. 2.

During a power running period of the reactor, that is, when the liquid sodium 2 is circulated through the operation of the center return type electromagnetic circulation pump 18, the liquid sodium 2 sucks, from the lower portion of an outside flow passage 19 of the circulation pump 18, the coolant, in the low-pressure plenum 11, which has become low temperature and low pressure during the passing through the intermediate heat exchanger 6, and the pressure of the coolant is then increased by means of an induction coil 32 and discharge upward as viewed. In this operation, a discharge pressure of the coolant is set to P1 (pressure of the low-pressure plenum P2+ $\Delta$ P) in consideration of a pressure loss $\Delta$ P at the core 8. The coolant discharge with the pressure P1 collides against the conical top dome 21 of the electromagnetic circulation pump 18 and changes its flow direction towards an inside flow passage 20, and the coolant flowing in the inside passage 20 flows downward therein and out into the high-pressure plenum 17.

The coolant discharge into the high-pressure plenum 17 then flows into a fuel assembly 30 through a connection tube 31 disposed at the lower portion of the core 8 and flows upward through the fuel assembly 30 while cooling the same. During this passing, the coolant is heated and pressure-lowered and then flown out into the low-pressure plenum 11. Thereafter, the coolant is heat exchaged with the secondary coolant, i.e. secondary sodium, in the intermediate heat exchanger and then flows into the lower end portion of the electromagnetic circulation pump 18, thus completing the circulation. In such circulation, since the top dome 21 is provided with the central fine penetration hole 25, the coolant 23 separated from the low-pressure plenum 11 by the location of an electromagnetic pump cylinder 33 is increased in its pressure to the value of P1 like the pressure increasing by means of the induction coil 32. Accordingly, an accumulated gas 29 in the closed gas space 22 in the electromagnetic pump cylinder 33 above the coolant 23 is also pressure-increased to the value of P1. That is, the pressure of the accumulated gas 29 is higher than that in the low-pressure plenum 11 by the pressure component of $\Delta$ P.

In the case of a trip of the electromagnetic circulation pump 18, since the pressure increasing caused by the induction coil 32 is instantaneously stopped, the discharge pressure becomes zero. For this reason, the pressure P1 of the coolant in the inside passage 20 becomes equal to the pressure P2 in the low-pressure plenum 11. Accordingly, in this state, when there is no external cause, the pressure P1 in the high-pressure plenum 17 becomes equal to the pressure P2 in the low-pressure plenum 11, resulting in no coolant flow through the fuel assembly 30. It becomes therefore necessary, at substantially the same time of the trip of the electromagnetic circulation pump 18, to insert the control rods into the core 8 to stop the operation thereof or to flow the coolant through the fuel assembly by at least several seconds after the trip through the electric time delay or mechanical insertion delay.

In this first embodiment, when the trip is caused to the electromagnetic circulation pump 18, the pressure difference $\Delta$ P corresponding to the discharge pressure component is caused between the pressure in the inside passage 20 and the pressure in the closed gas space 22, and according to this pressure difference, the sodium as the coolant stored in the upper portion is naturally flows downward of the inside passage 20, that is to the side of the high-pressure plenum 17, thereby cooling the fuel assembly in the core 8. In the construction of the penetration hole 25 of the top dome 21 into fine pipe shape, it may be expected to suck the coolant in the surrounding low-pressure plenum 11 into the outside passage 19, whereby the coolant flow quantity into the fuel assembly 30 can be increased at the trip of the electromagnetic circulation pump 18.

As described hereinabove, according to the present embodiment, at the time of the trip of the electromagnetic circulation pump 18, the coolant can flow into the fuel assebly 30 by a certain time interval only by utilizing the pressure difference caused between the power operation period and the core shutdown period without imparting any external electric or mechanical force. This can be performed only by utilizing the static physical phenomenon, so that this can necessarily act at the trip time of the electromagnetic circulation pump 18, thus ensuring the intrinsic safeness of the core.

Figure 3:
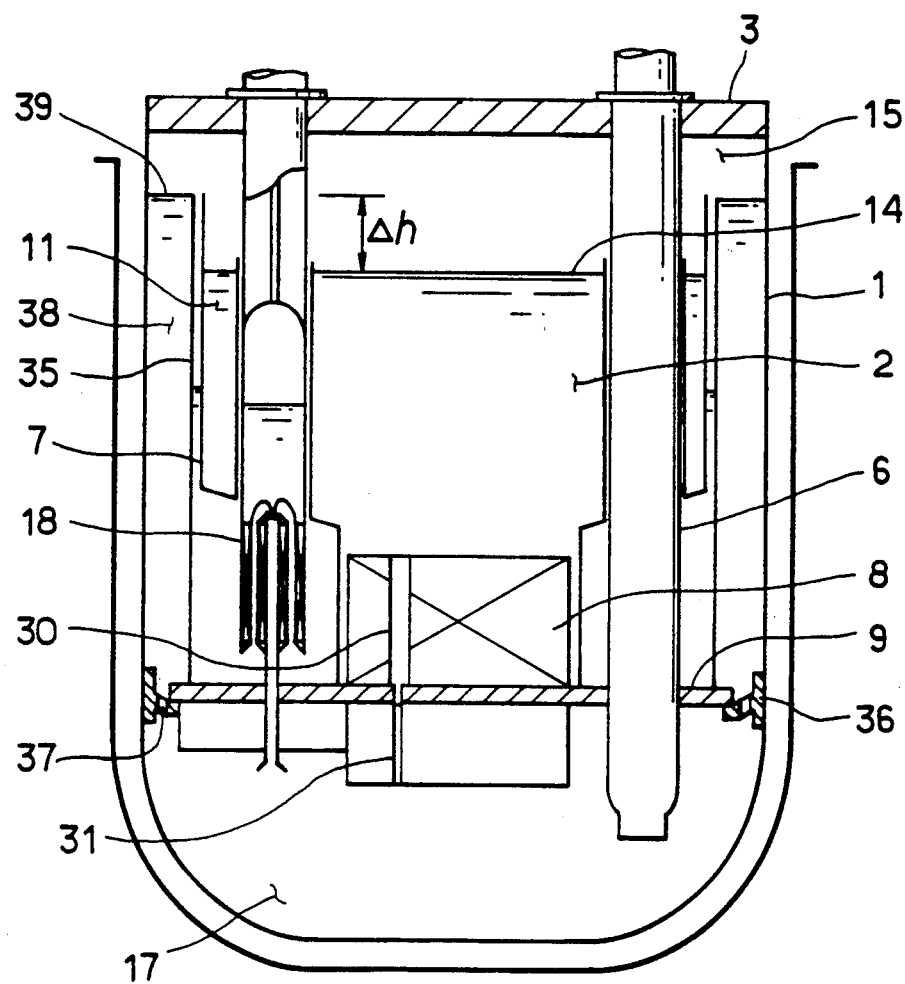
FIG. 3 shows an elevational section of a second embodiment according to the present invention.

FIG. 3 represents a second embodiment of a sodium cooled fast reactor according to the present invention, in which like reference numerals are added to portions or members corresponding to those shown in FIGS. 1 and 2.

The embodiment of FIG. 3 has a structure for ensuring the coolant flow quantity through the fuel assembly at the pump trip. Referring to FIG. 3, a cylindrical dam wall structure 35 is disposed inside the reactor vessel 1 concentrically therewith for separating a tourus plenum 38 as an outer side coolant area from the low-pressure plenum after the flowing out of the coolant from the core 8. The lower portion of the tourus plenum 38 is communicated with the high-pressure plenum 17 through penetration holes 37 formed to the core support structure 36. The dam wall structure 35 has a vertical height higher than the liquid level of the low-pressure plenum 11, but is slightly lower than a component corresponding to the coolant liquid column difference conversion of the pressure difference between the high- and low-pressure plenums 17 and 11 at the steady operation at a temperature of the operating period.

This second embodiment will operates as follows.

In the power operation period of the reactor, the coolant stored in the tourus plenum 38 between the dam wall structure 35 and the outer wall of the reactor vessel 1 is forced upward by the pressure P1 of the high pressure plenum 17 and the free liquid surface 39 hence increases. The coolant then overflows into the low-pressure plenum 11 over the upper portion of the dam wall structure 35 having the hight slightly lower than a height corresponding to the prssure defference $\Delta$ P, thus circulating. Accordingly, in the steady power operation period of the reactor, there always exists a liquid level difference $\Delta$ h between the surface of the coolant in the tourus plenum 38 and the low-pressure plenum 11.

In the trip of the electromagnetic circulation pump 18, the discharging pressure of the circulation pump 18 vanishes and the pressure in the high-pressure plenum 17 is hence lowered. Accordingly, the coolant in the tourus plenum 38 flows into the high-pressure plenum 17 by an amount corresponding to the liquid level through the holes 37 for keeping the pressure balance, and the coolant in the high-pressure plenum 17 then flows in the fuel assembly 30 in the core 8 through the communication tube 31 to thereby cool the fuel assembly 30 and thereafter flows into the low-pressure plenum 11, thus ensuring the flow rate at the trip of the circulation pump 18. The flow rate necessary for this trip may be optionally set in accordance with the distance between the dam wall structure 35 and the outer wall of the reactor vessel 1 and the size of the penetration holes 37.

The constructions of this second embodiment other than the above are substantially the same as those of the first embodiment.

According to this second embodiment, the flow rate of the coolant passing the fuel assembly can be ensured for the time being at the trip of the circulation pump only by the static system utilizing a potential energy due to the liquid level difference of the coolants in the plenums, so that the high reliability and the intrinsic safeness of the reactor can be achieved.

Figure 4:
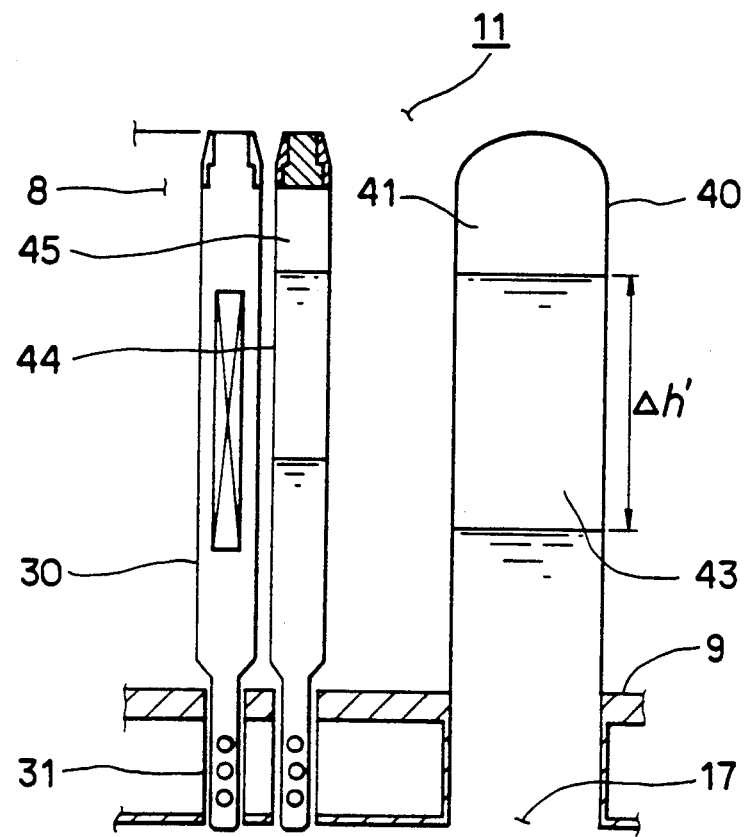
FIG. 4 shows an elevational section of a third embodiment according to the present invention.

FIG. 4 shows a third embodiment of the sodium cooled fast reactor according to the present invention, in which the fuel assembly 30 disposed in the core 8 and the associated portions are mainly shown and like reference numerals are added to elements or portions corresponding to those shown in FIGS. 1 and 2. The third embodiment employs the structure for ensuring the flow rate of the coolant passing the fuel assembly at the trip of the circulation pump by utilizing the closed gas accumulated energy. In this third embodiment, a closed vessel 40 is arranged at a peripheral portion of the core 8 disposed in the low-pressure plenum 11 in the reactor vessel 1, and the closed vessel 40 has a bottom opening communicating with the high-pressure plenum 17 and is provided with an upper closed gas space 41. According to the location of such closed vessel 40, the pressure of the gas space 41 is increased by the raising of the coolant 43 in the closed vessel 40 by the pressure of the high-pressure plenum 17, thus being accumulated to a pressure corresponding to that in the high-pressure plenum 17.

At an occurrence of the circulation pump trip, the pressure in the high-pressure plenum 17 is lowered and the energy accumulated in the gas space 41 is hence released, whereby the coolant 43 in the closed vessel 40 is flown outward, by the quantity corresponding to the height Δ h' to keep the pressure balance, through the communication tube 31 and the fuel assembly 30 to cool the same and flows into the low-pressure plenum 11. The flow rate of the coolant necessary for the circulation pump trip and the time by which the flow quantity is made half may be set to desired values by changing the numbers of the closed vessels 40 and the volumes of the gas spaces 41 in the closed vessels 40.

Furthermore, in this third embodiment, a closed tube 44 is also arranged in the core 8, and the closed tube 44 has a overall shape substantially identical to that of the fuel assembly 30 and provided with an inner upper closed gas space 45 and with lower end communicated with the high-pressure plenum 17. According to this arrangement, the closed gas space 45 is swallen at the time of the pump trip to thereby enhance the absorption of neutrons generated from the core 8 and to reduce the reaction thereof, thus performing the reactor shutdown, whereby the temperature increasing of the fuel assembly can be suppressed possibly at the pump trip and the intrinsic safeness of the reactor can be hence improved.

The constructions of this third embodiment other than the above are substantially the same as those of the first embodiment.

According to this third embodiment, the flow rate of the coolant passing the fuel assembly can be ensured for the time being at the trip of the circulation pump at the reactor shutdown period only by the static system utilizing the accumulated energy of the closed gas space, so that the high reliability and the intrinsic safeness of the reactor can be achieved.

Figure 5A:
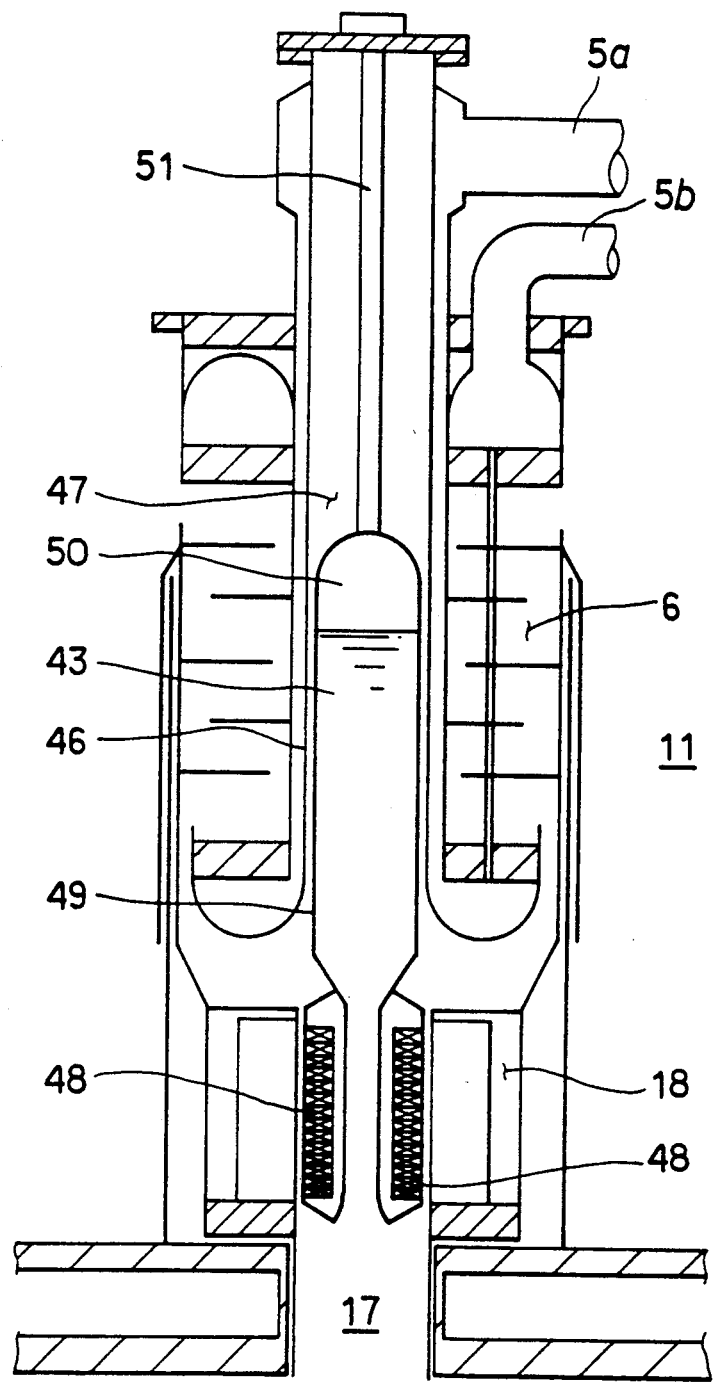
FIG. 5A is an elevational section of a fourth embodiment according to the present invention.

FIG. 5A shows a fourth embodiment of the sodium cooled fast reactor according to the present invention, in which like reference numerals are added to elements or portions corresponding to those shown in FIGS. 1 and 2. The fourth embodiment has a structure for ensuring the flow rate of the coolant passing the fuel assembly at the pump trip by utilizing a closed gas accumulated energy. In this fourth embodiment, an intermediate heat exchanger 6 and an electromagnetic circulation pump 18 of an inner coil-type are combined as a unitary cooling unit, in which the electromagnetic circulation pump 18 is accommodated in a shell of the heat exchanger 6 and a closed tube 49 having a lower end penetrating an inner casing 48 of the circulation pump 18 and communicated with the high-pressure plenum 17 is arranged in a space 47 defined in an inner cylinder 46 disposed for the heat exchanging.

In this embodiment, the inner casing 48 of the electromagnetic circulation pump 18 is suspended from its upper portion by a supporting rod 51 in which a power supply means for the electromagnetic circulation pump 18 is accommodated, and in the casing 48 is disposed a closed tube. The cooling unit is supended from the upper slab of the reactor vessel in a manner that the electromagnetic circulation pump 18 is disposed below the intermediate heat exchanger 6.

According to this structure of the fourth embodiment, during the power operation period, the coolant raises in the closed tube 49 to make equivalent the pressure in the closed tube 49 to the pressure in the high-pressure plenum 17 through the communication of the closed tube 49 and the high-pressure plenum 17 and, hence, the pressure in the closed gas space 50 is accumulated to the pressure equal to that in the high-pressure plenum 17. At an occurence of the pump trip, the pressure in the high-pressure plenum 17 lowers and the accumulated energy in the closed gas space 50 is hence released to thereby feed the coolant 43 in the closed tube 49 into the high-pressure plenum 17. As the result, the coolant in the high-pressure plenum 17 passes the fuel assembly 30 and then flows into the low-pressure plenum 11.

The constructions of this fourth embodiment other than the above are substantially the same as those of the first embodiment.

According to this fourth embodiment, since the closed gas space can be formed by utilizing a space necessarily provided inside the cooling unit, the reliability and the intrinsic safeness of the reactor can be achieved without imparting any affect on the arrangement of the machineries in the reactor and the sizes of the reactor vessel and the like.

FIG. 5B shows a modification of the embodiment of FIG. 5A, in which the closed tube 49 of FIG. 5A is eliminated from the space 47 and the inner casing 48 of the electromagnetic circulation pump 18 is directly supported in a suspended manner by the supporting rod 51. In this modification, the inner casing 48 can be easily removed by withdrawing the supporting rod 51 and the maintenance thereof can be also easily made.

It is to be noted that the present invention is not limited to the described embodiments and many other changes and modifications may be made within the scopes of the appended claims.

What is claimed is:

1. A sodium cooled fast ractor comprising:
   a reactor vessel in which a liquid metal coolant is accommodated;

a core disposed substantially a lower central portion of the reactor vessel in an installed state;

a core support structure secured to the reactor vessel for supporting the core, said core support structure dividing an interior of said reactor vessel into a high-pressure plenum below the core and a low-pressure plenum above the high-pressure plenum;

a circulation pump means for applying a discharge pressure to the liquid metal coolant and circulating the same; and an intermediate heat exchanging means for performing a heat exchanging operation of the coolant in the reactor vessel, said circulation pump means being composed of an electromagnetic circulation pump means provided with a discharge port and a closed gas space, which is filled up with a closed gas, defined above and communicated with the discharge port, said discharge port being also communicated with the high-pressure plenum, wherein the liquid metal coolant above the discharge port flows into the high-pressure plenum by the discharge gas pressure of the gas accumulated in the closed gas space by the actuation of the electromagnetic circulation pump means at a time of trip thereof.

2. A sodium cooled fast reactor according to claim 1, wherein said discharge port is composed of a domed structure having a central through hole.

3. A sodium cooled fast reactor according to claim 1, wherein said closed gas is argon gas.

4. A sodium cooled fast reactor according to claim 1, further comprising a dam wall structure concentrically disposed inside of an inner wall of the reactor vessel for defining a tourus plenum between the dam wall structure and the inner wall of the reactor vessel, said tourus plenum being communicated with the high-pressure plenum.

5. A sodium cooled fast reactor according to claim 4, wherein said tourus wall structure is provided with a bottom end secured to the core support structure and a top end disposed above a free surface level of the liquid metal coolant filling in the low-pressure plenum, said tourus plenum being communicated with the high-pressure plenum through a hole formed to the core support structure, wherein the liquid metal coolant flows from the tourus plenum into the high-pressure plenum in accordance with a liquid surface level difference between the liquid metal coolant in the tourus plenum and that in the low-pressure plenum at a time of the trip of the electromagnetic circulation pump means.

6. A sodium cooled fast reactor according to claim 1, wherein said liquid metal coolant is a liquid metal sodium.

7. A sodium cooled fast ractor according to claim 1, wherein said electromagnetic circulation pump means and said intermediate heat exchanging means are constructed integrally as a cooling unit and wherein said electromagnetic circulation pump means includes an inner casing in a suspended manner in which a closed tube is disposed so as to penetrate the inner casing, said closed tube being filled up with the liquid metal coolant with an upper space filled up with a closed gas, in an installed state, and communicated with said high-pressure plenum at the discharge port.

8. A sodium cooled fast reactor according to claim 7, wherein said cooling unit is supended from an upper structure closing an upper opening of the reactor vessel.

9. A sodium cooled fast reactor according to claim 8, wherein said electromagnetic circulation pump means is disposed below said intermediate heat exchanging means in an installed state.

10. A sodium cooled fast reactor according to claim 7, wherein said cooling unit is provided with an inner space for a heat exchanging operation in which said inner cylinder is disposed.

11. A sodium cooled fast reactor according to claim 7, wherein said liquid metal coolant is a liquid metal sodium.

* * * * *